E. F. HATHAWAY & C. LEA.
WARP LEASING MACHINE.
APPLICATION FILED MAY 4, 1914.

1,289,749.

Patented Dec. 31, 1918.
8 SHEETS—SHEET 1.

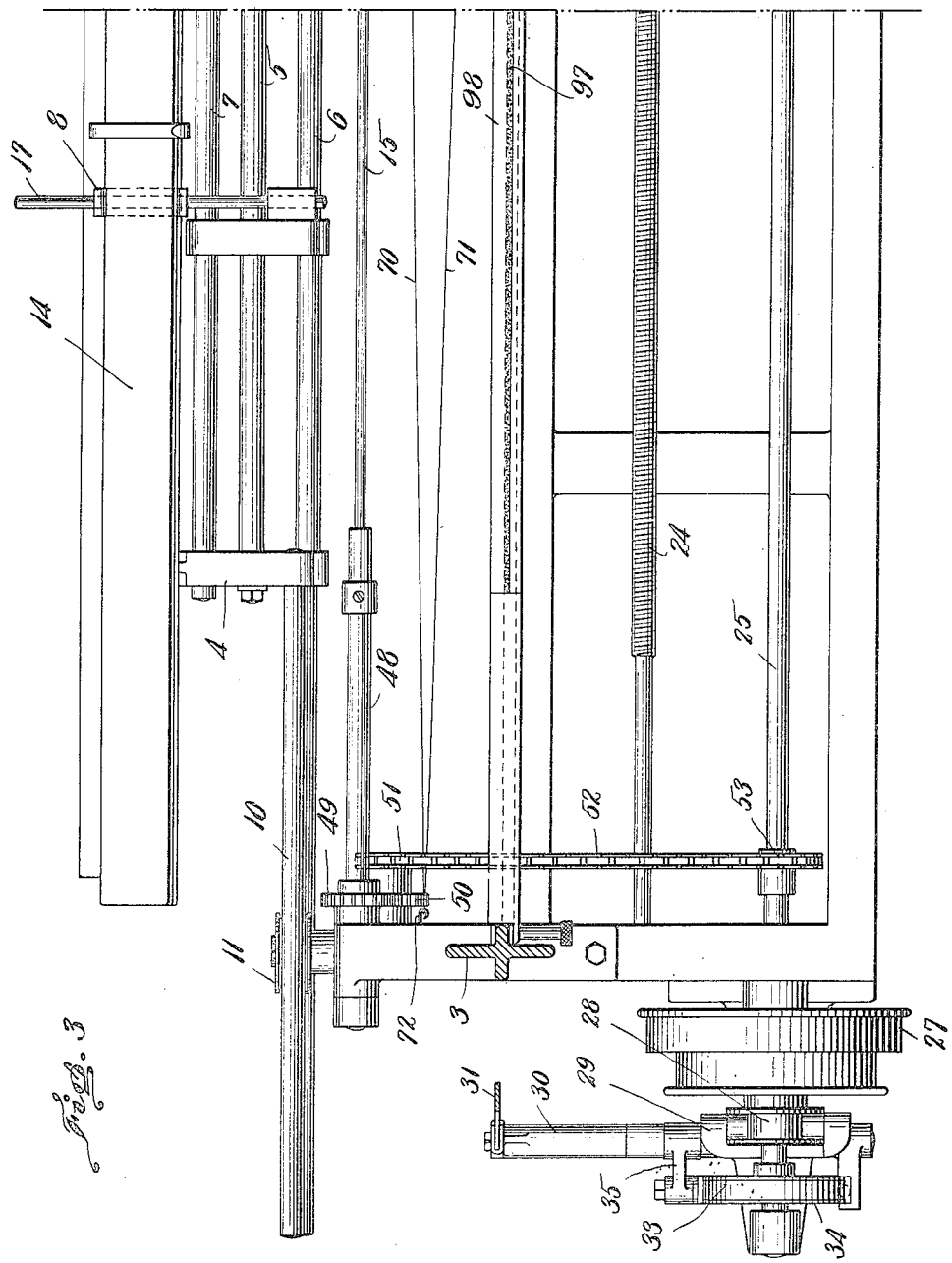

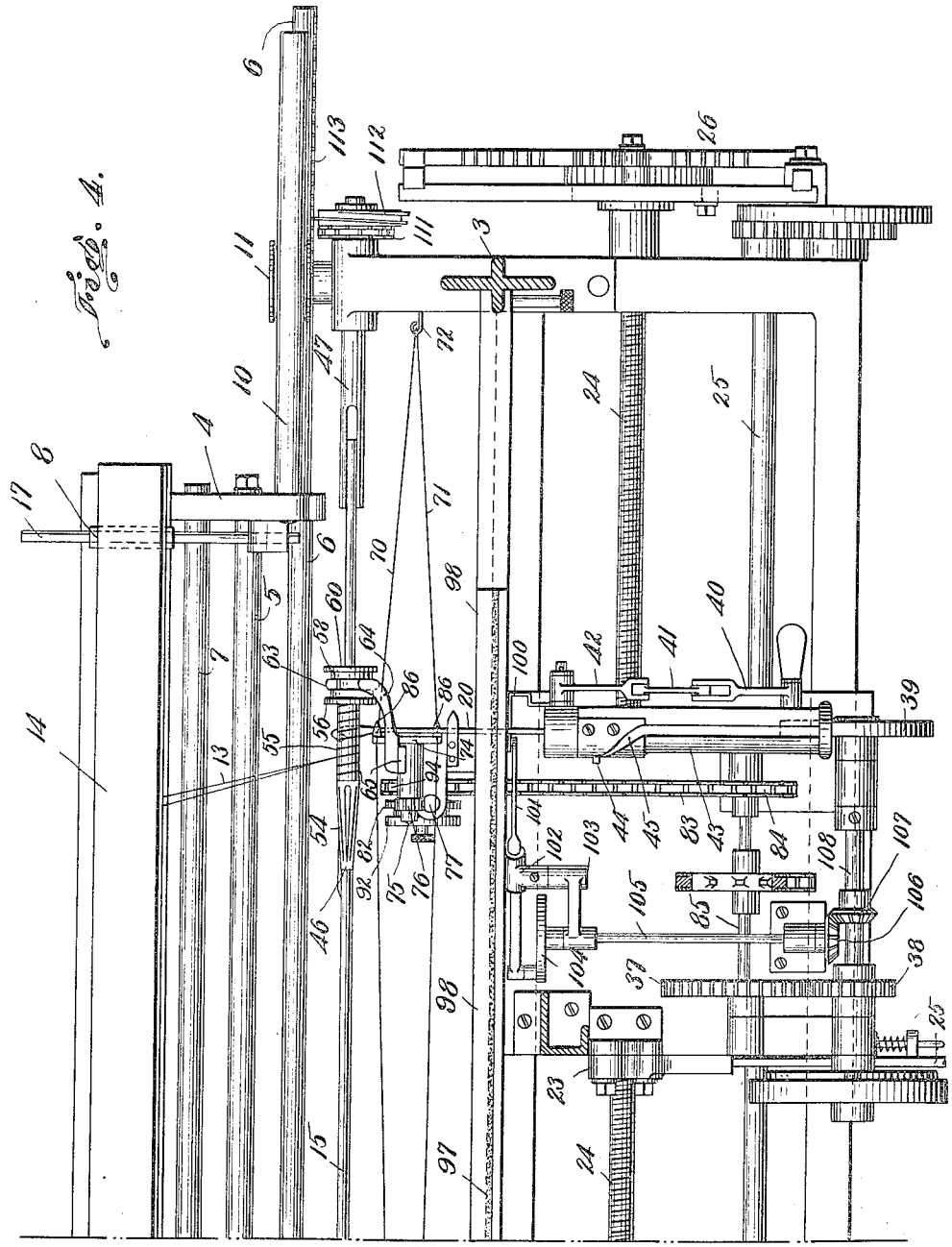

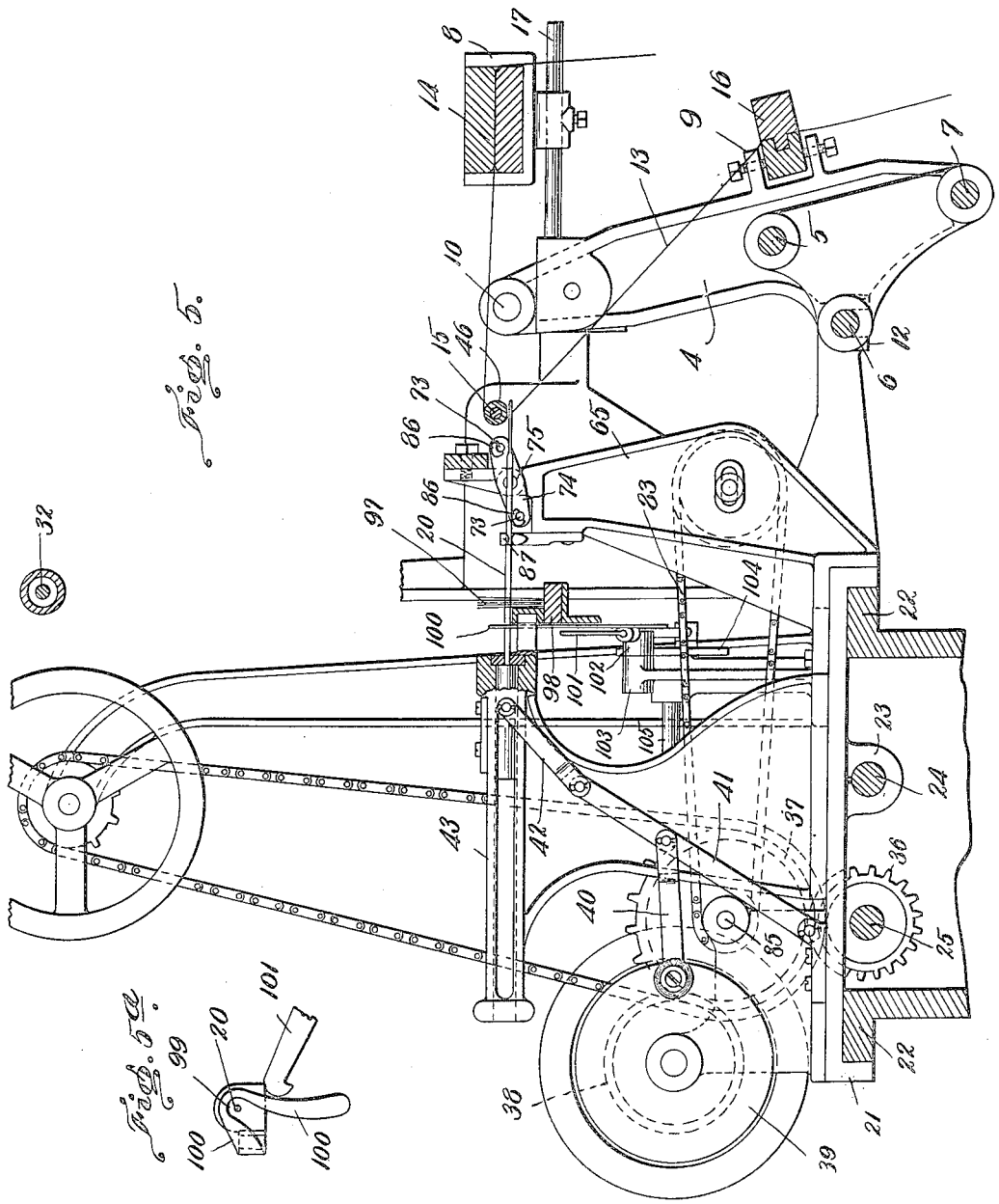

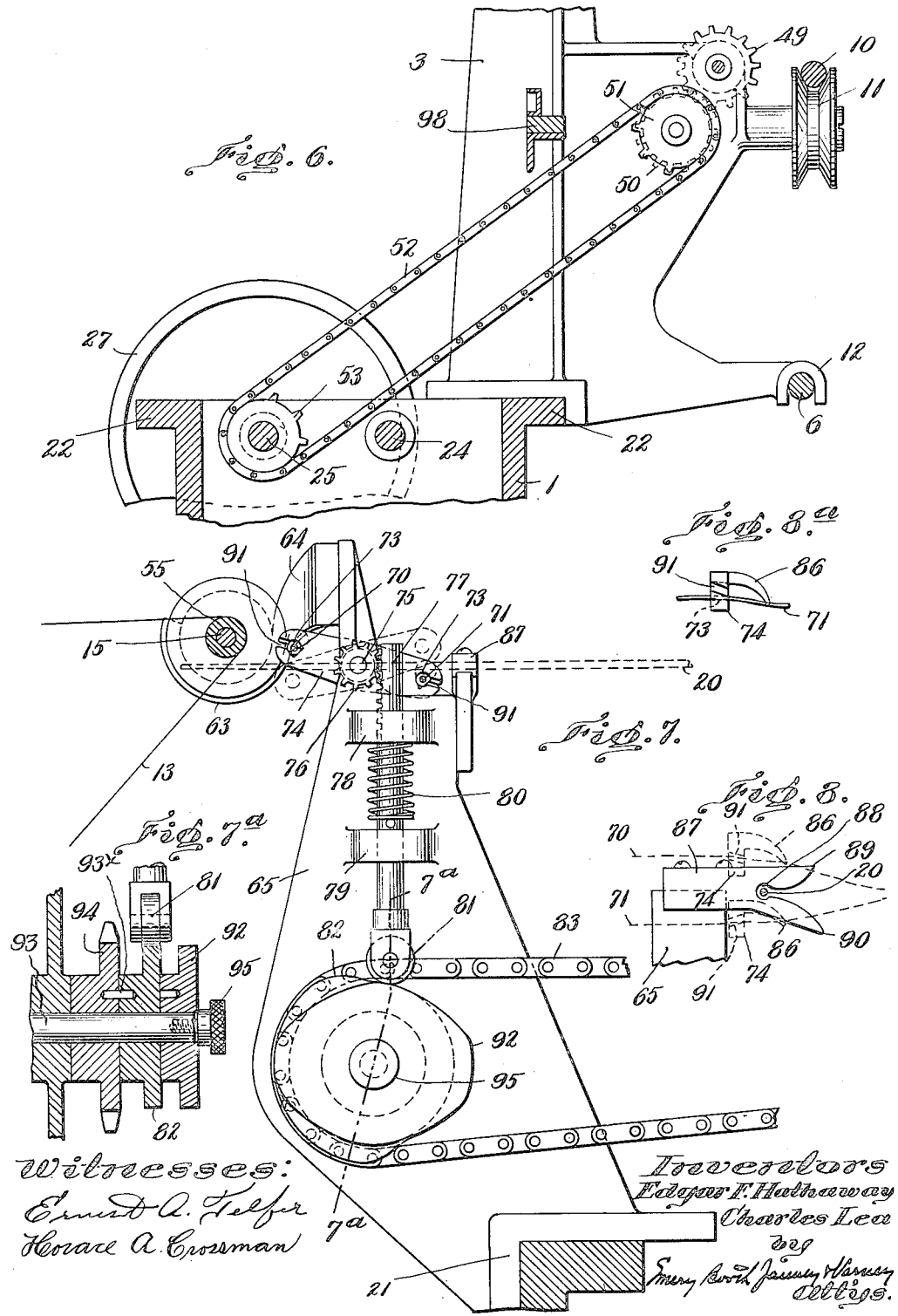

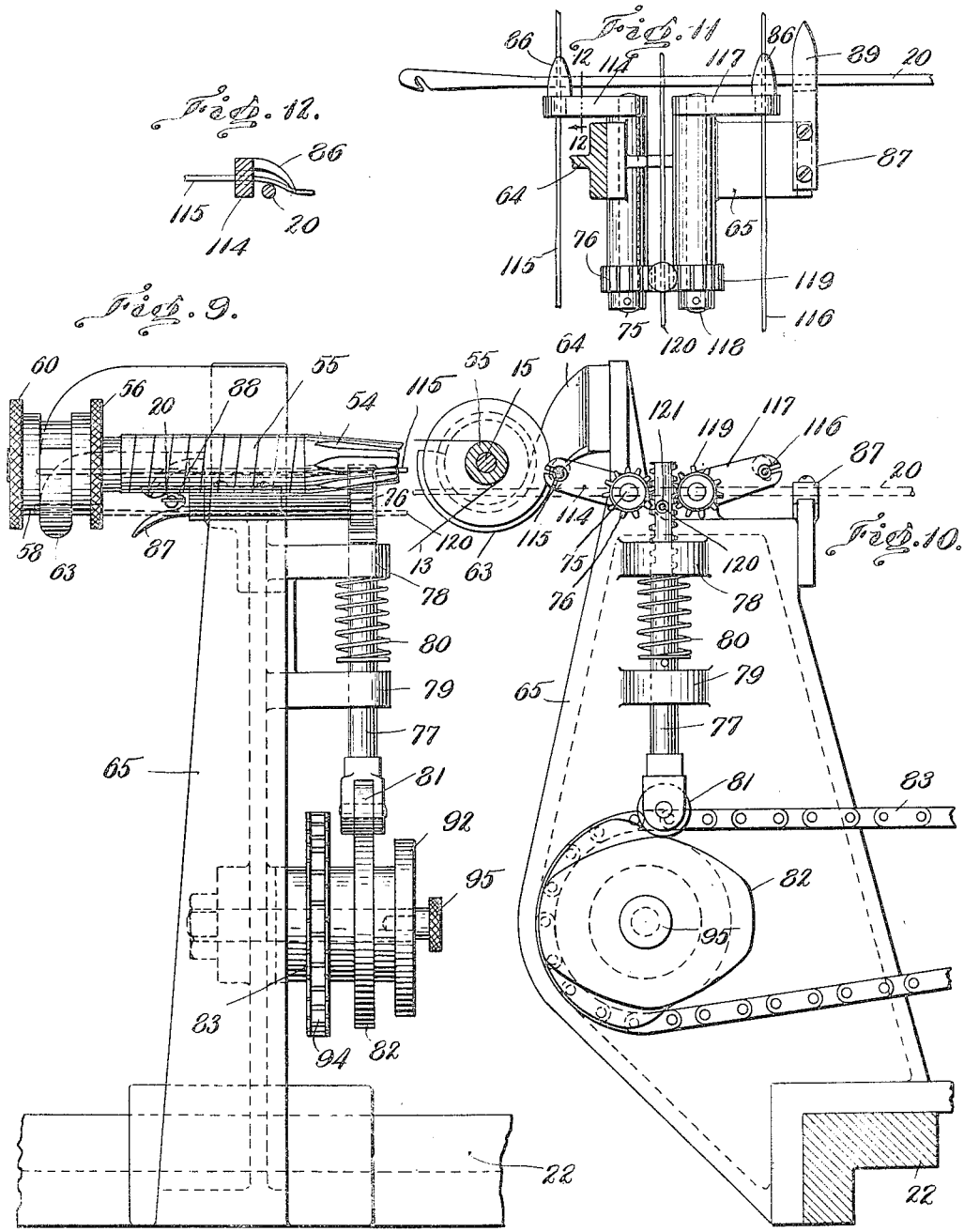

UNITED STATES PATENT OFFICE.

EDGAR F. HATHAWAY AND CHARLES LEA, OF BOSTON, MASSACHUSETTS, ASSIGNORS TO AMERICAN WARP DRAWING MACHINE COMPANY, A CORPORATION OF MAINE.

WARP-LEASING MACHINE.

1,289,749.  Specification of Letters Patent.  Patented Dec. 31, 1918.

Application filed May 4, 1914. Serial No. 836,254.

*To all whom it may concern:*

Be it known that we, EDGAR F. HATHAWAY and CHARLES LEA, both citizens of the United States, and residents of Boston, county of Suffolk, State of Massachusetts, (whose post-office addresses are 195 Freeport street, Dorchester, Massachusetts,) have invented an Improvement in Warp-Leasing Machines, of which the following description, in connection with the accompanying drawings, is a specification, like characters on the drawings representing like parts.

This invention relates to warp leasing machines intended for mechanically leasing a warp and more particularly, though not exclusively, a new warp which it is desired to have leased prior to its insertion in the loom.

The invention will be best understood by reference to the following description when taken in connection with the accompanying illustration of one specific embodiment thereof, while its scope will be more particularly pointed out in the appended claims.

In the drawings:

Fig. 3 is a plan view of the portion of the machine shown in Fig. 1;

Fig. 4 is a plan view of the opposite end of the machine or that shown in Fig. 2;

Fig. 5 is a transverse section in elevation taken on the line 5—5 in Fig. 2 showing the principal working parts of the machine;

Figure 1:
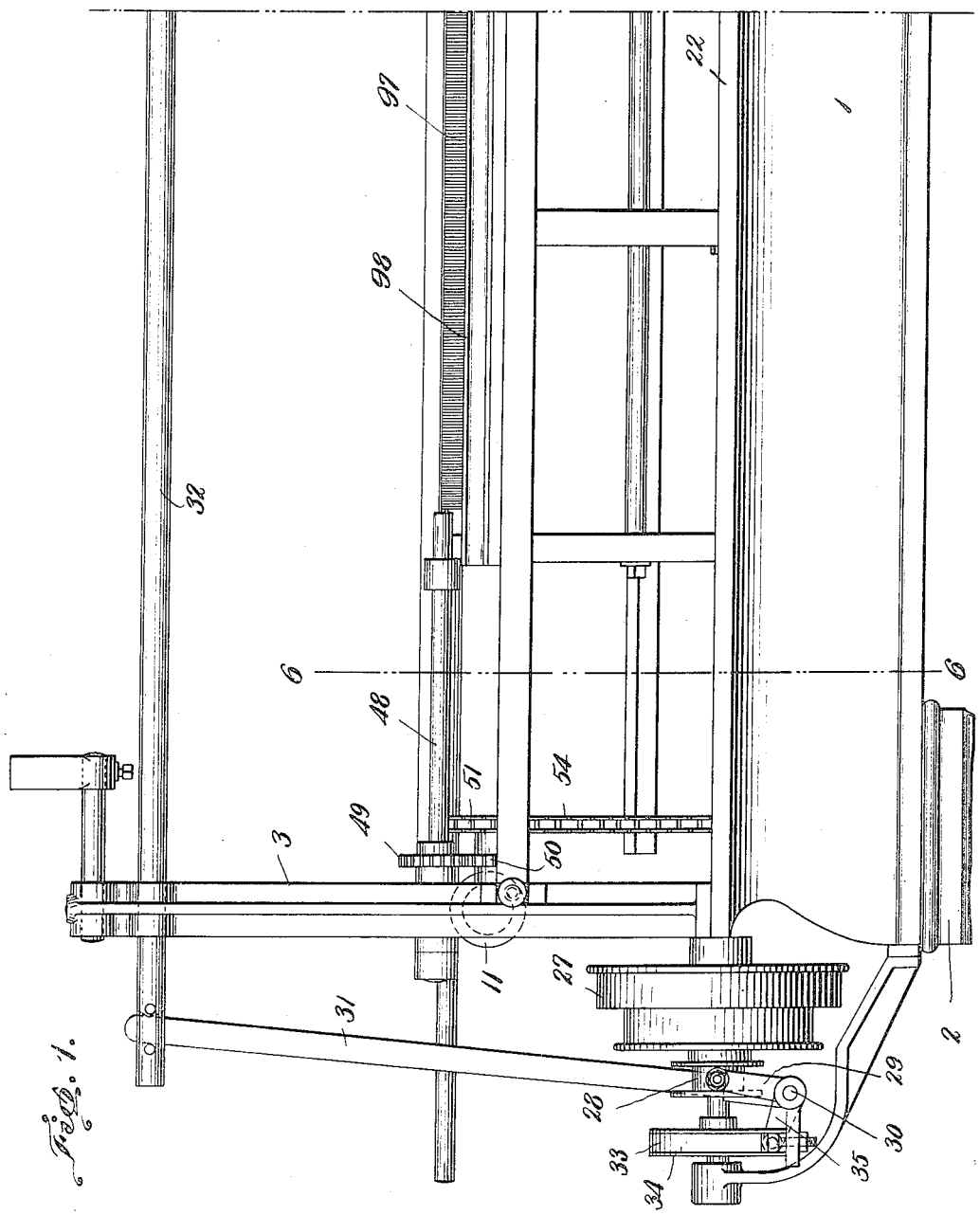
Figure 1 is an elevation of one end of a machine embodying one form of our invention looking from the rear or carriage side of the machine.
Figure 2:
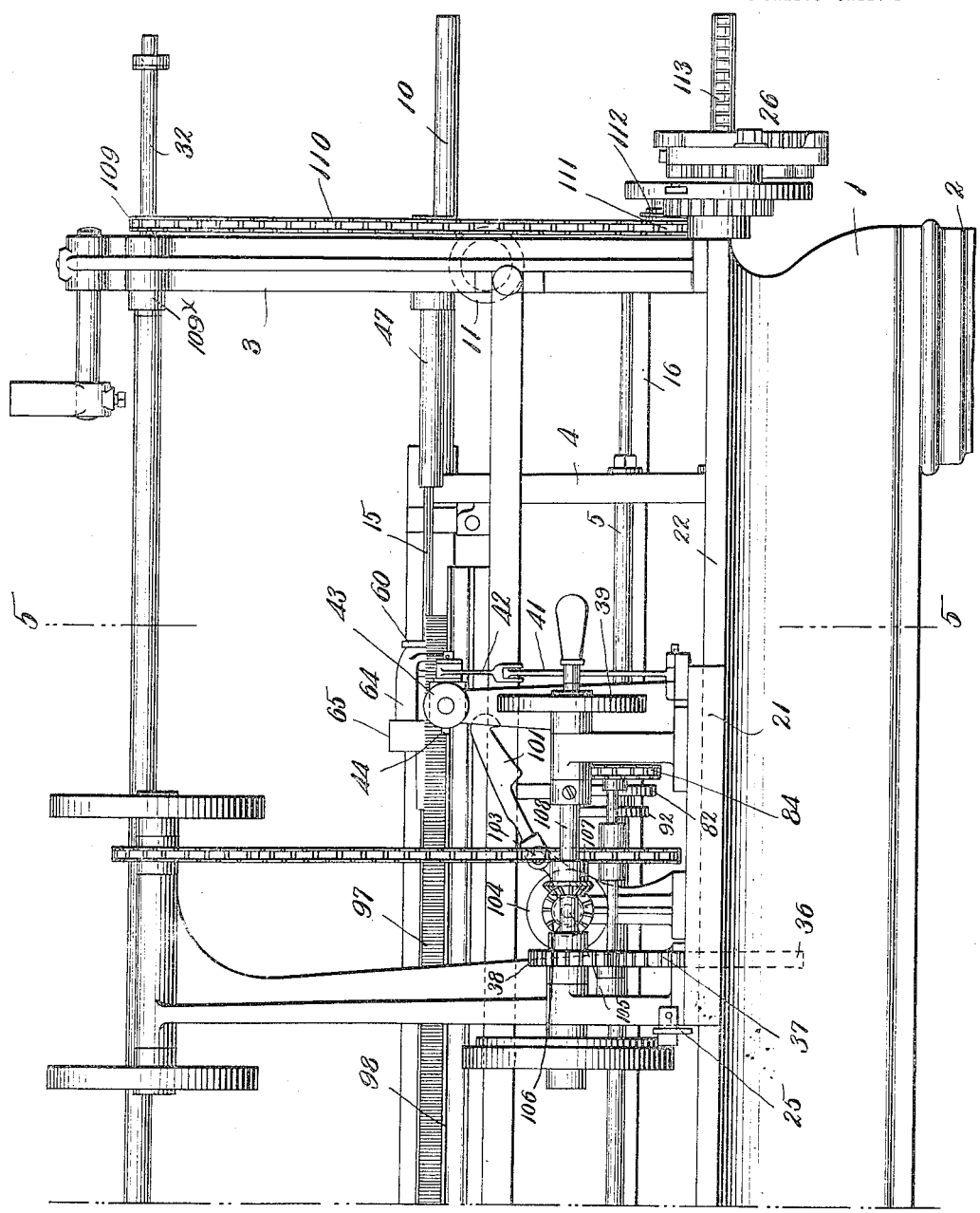
Fig. 2 is a similar view of the opposite end of the machine, the same constituting in effect an extension of the view shown in Fig. 1.
Figure 13:
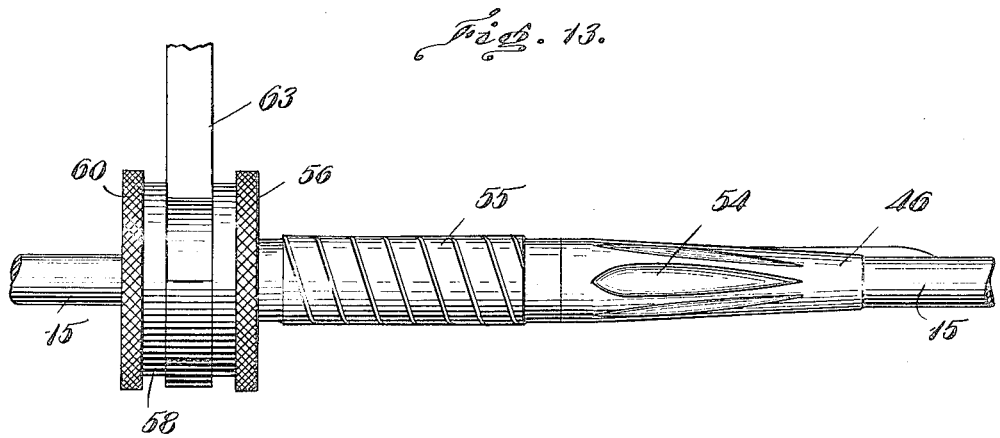
Figure 14:
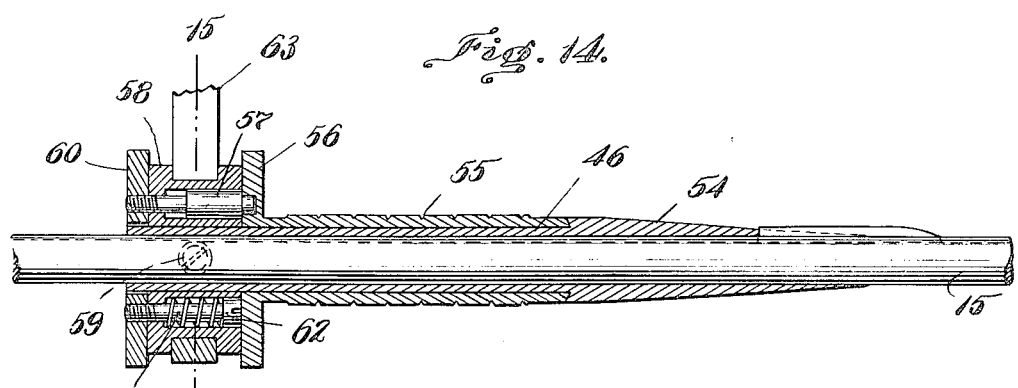

Fig. 5ª is a detail showing the thread guard or deflector and looking from the right in Fig. 5;

Fig. 6 is a similar sectional view taken on the line 6—6 in Fig. 1 showing the driving connections for the warp separator shaft;

Fig. 7 is a detail in sectional elevation on an enlarged scale looking toward the right as viewed in Figs. 2 and 4 and showing the devices for reciprocatively vibrating the lease cords, herein two in number;

Fig. 7ª is a transverse sectional elevation on the line 7ª—7ª in Fig. 7 showing the arrangement of interchangeable cams;

Fig. 8 is a detail in rear elevation showing the relation of the needle thread guide and lease cord holders;

Fig. 8ª is a detail showing the front elevation of one of the lease cord holding and guiding members;

Fig. 9 is a front elevation showing the modified form of lease cord reciprocating mechanism employing three leasing members;

Fig. 10 is a side elevation of the mechanism shown in Fig. 9;

Fig. 11 shows the same in plan;

Fig. 12 is a section in front elevation taken on the line 12—12 in Fig. 11;

Fig. 13 is an elevation on an enlarged scale showing the warp thread separating and selecting device;

Fig. 14 is a longitudinal sectional elevation of the same; and

Figure 15:
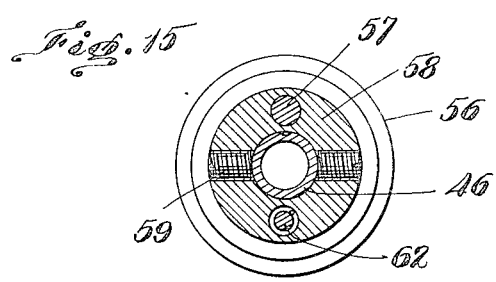

Fig. 15 is a transverse section taken on the line 15—15 in Fig. 14.

While the various elements of the machine to be described may be arranged in other relations than those herein set forth, and while the details thereof may be widely varied from those disclosed in the herein specific and illustrative form of machine, there is here provided a carriage sustaining a reciprocatory thread-placing device and operating mechanism therefor, which carriage is caused to advance progressively lengthwise the machine to traverse the warp, the latter being maintained with its threads held in substantially parallel arrangement. The advancing thread-placing device is caused to seize the foremost warp thread and place the same between suitably positioned lease members, these being herein in the form of flexible cords or other flexible members suitably held at their opposite ends upon the frame of the machine.

Means are provided to coöperate with the thread-placing device to strip the drawn thread therefrom and thrust aside the leased threads from the line of action. At suitable times, and ordinarily between successive thread drawings, the relation of the lease cords is shifted by guiding and holding devices which are here mounted on the traveling carriage to travel therewith so that in the described machine the successive threads are left reversely arranged between the lease members.

Referring to the drawings and to the illustrative embodiment of the invention, there is provided a suitably supported bed or frame 1 supported by the legs 2 and carrying the end frame members 3 which serve as supports for the warp shaft, lease cords and other members.

The warp is sustained during the operation of the machine in a warp carriage or holder of any suitable construction, but which here comprises the end frame members 4 (Figs. 3, 4 and 5) which are connected by rods 5, 6 and 7 and have the upper and lower clamping jaws 8 and 9, respectively. The carriage is supported by oppositely extended hanger rods 10 resting on roller supports 11 journaled on the frame of the machine (Figs. 3, 4 and 6) and thereby maintaining the carriage for longitudinal adjustment lengthwise the machine. The projecting ends of the connecting rod 6 are caused by the weight of the carriage to press one against a suitably formed guiding portion 12 (Figs. 5 and 6) at one end of the stationary frame of the machine and the other against a worm 112 (Fig. 4) to be later described.

The warp threads designated at 13 when positioned in the machine have their free ends clamped loosely in the usual clamp bar 14 which is placed in the upper pair of clamping jaws 8. From the clamp bar 14 the threads pass over the thread separator shaft 15 and thence downwardly and outwardly to the second clamp bar 16 wherein they are tightly held and thence down to the loom beam (not shown). The upper clamping jaws 8 are adjustably mounted on the supporting rods 17 so that they may be adjusted toward and from the separator shaft 15 to put the necessary tension upon the threads over that shaft.

The thread-placing device, herein in the form of a drawing-in needle 20, is mounted upon a carriage 21, the latter being adapted to slide lengthwise the machine and transversely the warp upon suitable guideways 22 formed on the bed of the machine. During the travel of the carriage the needle is given a reciprocatory movement to and from the threads of the warp.

The construction of the needle carriage, the traversing mechanism therefor, and the needle operating and thread stripping mechanism is substantially the same as that shown in prior patent to Field et al. No. 871,680, dated November 1, 1907, and need only be briefly referred to.

To advance the carriage, the latter is provided with a split nut 23 (Figs. 4 and 5) which may be thrown into or out of engagement with the lead screw 24 by means of the hand lever 25. The lead screw is continuously rotated during the operation of the machine for the gradual advance of the carriage from the main drive shaft 25' through chain transmission devices which are shown at the right in Figs. 2 and 4, and designated generally by the numeral 26. These may be of any suitable construction, but herein they are of the type described in patent to Lea No. 1,090,401, dated March 17, 1914.

The drive shaft 25' carries at its opposite end the loosely journaled driving pulley 27 which may be clutched to the shaft by means of the sliding clutch member 28, the latter in turn being operated by the forked lever arm 29, the rock shaft 30, upright lever arm 31 and sliding actuator rod 32, the latter extending the full length of the machine and slidably mounted in the frame members 3 so that the main drive shaft clutch may be thrown into or out of engagement by the operator at any point along the machine. A brake band 33 embracing the brake drum 34 on the main drive shaft is also adapted to be applied or released simultaneously with the release or application, respectively, of the clutch member by means of the brake lever arm 35 also connected to the rock shaft 30.

The drive shaft is splined to permit driving engagement therewith of the gear 36 (Fig. 5), the latter mounted to slide with the carriage lengthwise the machine and acting to drive the operating mechanism thereon. The gear 36 meshes with the needle operating gear 37, which latter acts through an intermediate gear 38 and the crank disk 39 and connecting link 40 to move the pivoted arm 41 and the link 42 for reciprocation of the drawing-in needle 20. The latter slides in a sleeve or cylinder 43 and is given a partial turn on its advance and retraction by the engagement of a pin 44 (Fig. 4) upon the needle with a partially spiral slot 45 in the sleeve. The movement of the needle is so timed that it undergoes one complete reciprocation as the carriage is advanced a space corresponding approximately to the spacing between successive warp threads.

Acting in advance of the needle and herein progressively advancing with the carriage, there is provided thread-separating means for selecting and separating the foremost warp threads and positioning a thread in the needle path for each thread drawing. Herein such thread separating member is in the form of a sleeve 46 (Figs. 4, 13, 14 and 15) splined upon the driving shaft 15. The shaft 15 is loosely journaled at one end (Fig. 4) in the rod 47 held fixed in the frame of the machine, the end of the rod where it receives the shaft being slotted at the top to permit the ready removal of the shaft. At its opposite end (Fig. 3) it is secured to turn with the sleeve 48, the latter journaled in the opposite frame member and driven from the main driving shaft by means of the intermeshing gears 49 and 50 (Figs. 3 and 6), the sprocket wheel 51, connecting sprocket chain 52 and sprocket wheel 53, the latter on the main drive shaft 25'.

Referring to Figs. 13 to 15, inclusive, the sleeve member 46 has a corrugated tapered nose 54 which strokes the threads into parallelism, this being succeeded by a spirally grooved portion 55, the advancing lip of which picks up the foremost thread and conveys it into the path of the needle. The spirally grooved sleeve 55 can be angularly adjusted upon the sleeve member 46. For this purpose the sleeve 55 terminates in a flanged portion 56 having a recess in which there is adapted to seat the pin 57 slidably mounted in the collar 58, the latter being fast to the sleeve 46 by means of the set screw 59 shown in Fig. 15. The opposite end of the pin 57 is threaded into a disk 60 which latter is normally held close against the face of the collar 58 by the stud 61. The latter has one end threaded into the collar, but is provided with a head 62 sliding in a recess in the collar, a spring being interposed between the head and the bottom of the recess yieldably to force the collar into the position shown.

The collar, however, may be drawn to the left, as viewed in Fig. 14, withdrawing the pin 57 from the flange of the sleeve 56, whereupon the latter may be turned, thereby to adjust the lip of the screw or helix in different angular positions about the shaft. The flange 56 may be provided with a plurality of recesses distributed circumferentially about the same to permit of different positions of adjustment of the pin 57.

The collar 58 is circumferentially grooved as shown in Figs. 13 and 14 and rests by its groove in the hook-shaped bracket 63, which latter is carried by an arm 64 fastened to an upright support 65 (Figs. 4 and 7) fixed on the needle carriage 21, so that the separating worm advances progressively across the machine always in fixed relation to the needle but being turned in suitably timed relation to present a thread for each thread drawing. The threads when engaged by the needle are drawn between suitably positioned lease members. These may be of any desired number, arranged for any desired movement and of any suitable construction, but in the embodiment of the machine shown in Figs. 1 to 8, inclusive, they comprise a pair of flexible lease members, herein in the form of cords 70 and 71 which are each arranged parallel with the travel of the needle carriage lengthwise the machine. The ends of the cords may be conveniently secured to the hooks 72, one hook at each end of the two cords. The construction of the cord-holding and guiding means on the needle carriage renders the use of tensioned cords unnecessary.

During the operation of the machine the leasing cords 70 and 71 are intermittently vibrated to impart to them a reverse reciprocatory movement so as to place them alternately above and below the plane of needle action. For this purpose the cords pass through guiding and holding devices carried by the needle carriage, herein in the form of guiding eyes 73 formed in the opposite ends of the oscillatory lever arm 74. The latter is at one end of a short shaft 75, the opposite end of which carries the pinion 76 meshing with the teeth of the vertically slidable and reciprocatory rack bar 77. The latter, which is guided for vertical movement in the lugs 78 and 79 at the side of the support 64, (Fig. 7) is normally depressed by the coiled spring 80 so that a cam roll 81 carried by the lower forked end of the said rod rests against the face of a cam 82. The latter is adapted to be turned in properly timed relation to the needle by a sprocket chain 83 (Figs. 4 and 5) which is driven from a sprocket wheel 84 carried upon the needle carriage shaft 85 driven by the gear 37. Rotative movement of the cam 82 which accompanies the needle reciprocation causes the vertical vibratory movement of the rack 77 and the intermittent oscillatory reciprocation of the swinging arm 74, the timing being such that the guiding and holding eyes are thrown from the full line position shown in Fig. 7 to the dotted line position at the end of one needle reciprocation and again to the full line position at the end of the next needle reciprocation, the two lease cords being therefore thrown alternately to opposite sides of the plane of needle movement on each thread drawing movement thereof. The result is that the two lease members are caused to be alternately depressed and elevated at or about the path of the needle between successive thread drawings so that while positioned as shown in full lines in Fig. 7 on one thread drawing, they are subsequently reversed in relation and positioned as shown in dotted lines on the next thread drawing. They are then returned to the position shown in full lines, this resulting in the positioning of successively drawn threads on opposite sides of the lease cords and the formation of a lease.

In order to move the leased threads away from the line of action of the needle and prevent their subsequent crossing over or under the needle path, means are preferably provided for thrusting aside a drawn thread. This is conveniently accomplished herein by providing the reciprocatory lease cord holding members themselves with such a formation or with such means that their movement automatically tends to thrust the leased thread aside toward the already leased threads of the warp. Herein this is accomplished by providing thrust members 86 (Fig. 8ª) which project from the sides of the arm 74, one above each of the lease cords 70 and 71, in the direction opposite to the traverse of the needle carriage. These are curved outwardly and downwardly and when depressed lie directly under the needle path, as is represented in Fig. 8. As the depressed holding eye rises to its elevated position the thread which has just before been drawn between the two cords by the needle is wedged to one side (to the right as viewed in Fig. 8) so that assisted by the reversing movement of the lease cords which takes place at the same time this guard thrusts the leased thread clear of the path of the needle. This action is further assisted by means of a thread and needle guiding plate 87 secured to the upright support 65 and provided with an eye 88 registering with the path of the needle and with upper and lower propections or guards 89 and 90 the lower one of which is curved downwardly to act as a deflector assisting the deflection of the leased thread.

To assist in quickly setting up the machine the lease cord guiding eyes 73, which are substantially parallel with the normal position of the lease cords, are provided with lateral openings in the form of slots 91 (Fig. 8ª) which are inclined somewhat to the eye perforation 73. This permits the cords to be quickly inserted through the lateral insertion slots 91, whereupon they drop into the eyes 73 (assuming the position shown in Fig 8ª) and are without any tendency to escape from the insertion slots. The under side of the guard or horn 86 presses upon the top of the cord to coöperate with the eye in positioning the same. The cord, therefore, is held on one side of the needle path by the tip of the guard 86 pressing on its upper side and on the opposite side of the needle path it rests in the bottom of the eye 73. This construction permits the cord to be held in the machine without any particular regard to its being taut or under tension, the natural stiffness of the cord insuring its accurate position with respect to the needle as it is held between the guard 86 and the eye 73. This construction provides in effect a rigid guiding frame which spreads and guides the cords at the line of needle action and by its reciprocatory rocking or tipping movement positions the cords alternately and reversely with relation to the needle path.

The mechanism described will act to draw a single thread lease, that is to say, a lease wherein each successive thread is drawn on opposite sides of a given lease member. Provision, however, is made for drawing when required a two-thread lease, that is to say, one wherein pairs of successive threads lie upon the same side of a given lease member, the lease cords being reversed as to position only for each alternate thread drawing.

For this purpose the cam 82 which is shaped to give one reciprocation of the leased cord holding arm 74 for each thread drawing is interchangeable with a cam 92 so shaped as to give but one reciprocation of the arm 74 for each alternate thread drawing. The cams 82 and 92 are mounted upon a stud 93 (Fig. 7ª) on which the sprocket wheel 94 engaging the sprocket chain 83 has free rotative movement. The cams 82 and 92 each has a hole or recess in its inner face adapted to receive the driving pin 93ˣ fixed in and projecting from the outer face of the sprocket wheel 94. In Fig. 7ª the cam 82 is shown as rotatively engaged by the sprocket wheel driving pin 93ˣ, but, by removing the headed screw 95, the cams may be slid off from the stud, their positions reversed and the cam 92 placed in rotative engagement with the driving pin. When this adjustment is made, the machine is effective for drawing a two thread lease.

In the described machine the thread as it is drawn between the lease members is also drawn into engagement with suitable members which tend to retain it approximately in its drawn position and prevent the entanglement or disengagement of the leased thread. In the described machine this is arranged by providing a series of closely arranged members such as the resilient bristles 97 (Figs. 2, 4 and 5) or the like, the lower ends of which are held fastened on the supporting bar 98 secured to the frame in such position that the bristles are transverse to the line of needle action. This results in causing the free ends of the threads to be drawn and laid in the bristles where they are held with sufficient certainty to prevent the escape of the leased warp ends.

The free end of the thread after being withdrawn between the lease cords and through the bristles is drawn through the eye 99 of the guard and deflecting plate 100 (Figs. 5 and 5ª) back of the line of bristles, the eye having an opening slot through which the thread passes when stripped by the stripper arm 101. The latter (Figs. 2, 4 and 5) on each full retraction of the needle is caused to move transversely across the needle path and strip the free thread from the needle hook, regaining, however, its normal position before the next advance of the needle. The stripper arm 101 is slidably mounted in a sleeve 102 pivoted on the frame at 103, and is given a reciprocatory movement like that of a connecting rod through its connection to the crank disk 104. The latter is driven by the shaft 105, turned through the beveled gear 106 meshing with the gear 107, the latter upon the needle drive shaft 108 which is turned by the needle drive gear 38. The proportions of the gears are such that the stripper is caused to execute its stripping-movement upon each retraction of the needle.

The advance of the drawing needle is proportioned by means of the gearing 26 with close approximation to the spacing of the warp threads. Preferably to correct required deviations from the prearranged travel of the needle, there is provided a hand adjustment accessible to the operator of the machine for adjusting the entire series of warp threads lengthwise the travel of the needle and properly alining the foremost thread thereof with the needle path. For this purpose the overhead rod 32 is suitably journaled for rotative movement in the frame 3 and is splined at one end to the sprocket wheel 109, the latter mounted on a sleeve 109ˣ journaled in the frame member 3 and connected by the sprocket chain 110 with the underneath sprocket wheel 111 which is journaled in the frame of the machine and secured to a worm 112 of large diameter. The latter is caused to engage with suitably formed teeth 113 in the side or face of the adjacent hanger rod of the warp carriage so that on movement of the worm the carriage is given a slight compensating movement lengthwise the machine, so that the operator can control the same in any position.

The described machine is provided with two leasing members to draw a two cord lease. By a slight adjustment of the machine three leasing members may be employed and a three cord lease drawn. Such modification or adjustment of the machine is represented in Figs. 9 to 12, inclusive. In this machine there is substituted for the rock arm 74 having the two thread holding eyes a rock arm 114 having but a single thread holding eye. This controls the lease cord 115. A second lease cord 116 which moves up and down with the cord 115, is controlled by the guiding eye of a similar lever arm 117, the latter being mounted upon a shaft 118 journaled in the frame support 65 and carrying at its opposite end the pinion 119 similar to the pinion 76 on the shaft 75. The vertically movable rod 77 is provided with rack teeth on opposite sides thereof, one set meshing with the pinion 76 and the other with the pinion 119 so that as it is vibrated vertically the two arms 114 and 117 are simultaneously swung up or down. A third intermediate leasing cord 120 passes through a guiding eye 121 formed in the actuating rod 77 therefor. The other parts of the mechanism are similar to those previously described and the machine shown in Figs. 9 to 12, inclusive, may be converted into the previously described type of machine by merely taking off the arm 117, the shaft 118 and gear 119 and substituting for the arm 117 an arm similar to the arm 74. The result is that as the rod 77 is vertically reciprocated by the cam 82, the middle lease cord 120 is vibrated first from below the needle path to a point above, while the two lease cords 115 and 116 are simultaneously vibrated from a level above the needle path to a level below the same, successive threads being placed in reverse relation with reference to the two sets of lease members.

While we have herein shown and described one form of the invention, it is to be understood that the same is not limited to the details herein shown, nor to the particular arrangement of operating parts, nor the mode of sustaining the warp with reference to the operating elements of the machine, but that extensive modifications of the illustrated details may be made and wide departures therefrom followed without departing from the spirit of our invention.

Claims:

1. In a warp leasing machine, the combination with a plurality of flexible lease members, holding means for reversely vibrating said lease members, and an inclined guard projecting from the holding member at the side of one of the lease members to cause a leased thread to be forced away on movement of the holding means.

2. In a warp leasing machine, the combination with a pair of flexible lease members, a carriage adapted to have relative movement lengthwise said lease members, means upon said carriage for oppositely vibrating said lease members, means for drawing threads in succession from the warp between the lease members, and an inclined guard also on said carriage for thrusting a leased thread away from said vibrating means.

3. In a warp leasing apparatus, a device for vibrating a flexible lease member comprising a holding member through which the said lease member passes, and an overlying inclined guard projecting therefrom.

4. In a warp leasing apparatus, the combination with a device for vibrating a flexible lease member comprising a vibratory guide therefor having a guiding eye and an inclined guard projecting from one side of the eye and contacting with the lease member at one side of the eye.

5. In a warp leasing machine, the combination with a reciprocatory thread-placing member, a lease cord vibrating device having a guiding eye, an inclined guard projecting from above the eye to contact with the lease cord at the opposite side of the path of the thread-placing device, said guard being adapted to thrust aside a drawn-in leased thread.

6. In a warp leasing apparatus, a device for reciprocating a flexible lease member comprising a guide or holder having a lease-member guiding eye and provided also with a lateral slot, a warp support, means for progressively placing threads in succession from the warp across the lease member, and means for causing relative movement between said guiding and said lease member and between the thread-placing means and the lease member.

7. In a warp leasing apparatus, a device for reciprocating a flexible lease member comprising a guide or holder having a lease-member guiding eye provided also with a lateral slot for the insertion of said member, a warp support, means for progressively placing threads in succession from the warp across the lease member, and means for causing relative movement between said guiding and said lease member and between the thread-placing means and the lease member.

8. In a warp leasing apparatus, a device for reciprocating a flexible lease member comprising a guide or holder having a lease-member guiding eye provided also with a lateral slot for the insertion of said member, said slot being inclined to the axis of the eye, a warp support, means for progressively placing threads in succession from the warp across the lease member, and means for causing relative movement between said guiding and said lease member and between the thread-placing means and the lease member.

9. In a warp leasing machine, the combination with a reciprocatory thread placing device or devices for oppositely reciprocating a pair of flexible leasing members across the path of movement of the thread placing device, comprising holding and guiding means for the lease members having provision for the lateral insertion therein of the said lease members, and means for causing relative progressive movement between the thread-placing device and the lease members and between the guiding means and lease members.

10. In a leasing apparatus, a device for oppositely reciprocating a lease cord comprising a member having a holding and guiding eye with provision for the lateral insertion of the lease cord in said eye, a warp support, means for progressively placing warp threads in succession from the warp across the lease cord, and means for causing relative progressive movement between the holding and guiding eye and the lease cord and the thread placing device and the lease cord.

11. In a warp leasing machine, the combination with a reciprocatory thread-placing device, of means for reciprocatively moving a flexible lease member comprising means for holding and guiding said lease member simultaneously on opposite sides of the path of said thread-placing device, and means for reciprocating the same.

12. In a leasing apparatus, a device for reciprocating a flexible lease holding member comprising means for holding and guiding the same at two separated points, means for reciprocating said holding and guiding means, and means for causing relative traverse between the same and the said leasing member.

13. In a warp leasing apparatus, a device for oppositely reciprocating a pair of flexible leasing members comprising holding and guiding means for holding each of said members at two separated points, means for reciprocating said means to cause opposite movement of said lease members, and means for causing relative traverse between the said holding means and the said leasing members.

14. A leasing apparatus having means for oppositely reciprocating a pair of leasing members comprising holding and guiding means and means reciprocatively to rock the same about an axis.

15. In a warp leasing apparatus, holding and guiding means for a pair of flexible lease members, a carriage for traversing the same lengthwise the lease members, and means for reciprocatively rocking said holding and guiding means about an axis.

16. In a leasing apparatus, means for oppositely reciprocating a pair of flexible lease members comprising a rigid guiding frame and means to rock the same.

17. In a warp leasing apparatus, a device for oppositely reciprocating a pair of flexible lease members comprising a pivoted arm having guiding eyes on opposite sides of its pivot, and means to rock the said arm.

18. In a warp leasing apparatus, a device for reciprocatively moving a flexible lease member comprising a pivoted arm having an eye or guide, means for reciprocatively moving said arm, and means for causing relative traverse between the same and the leasing member.

19. In a leasing apparatus, a device for reciprocatively moving a flexible lease member comprising a pivoted arm adapted to guide said member, a pinion for moving said arm, a rack to engage the same, and means for reciprocating the rack.

20. In a warp leasing machine, the combination with a reciprocatory thread-placing device, a pair of lease members, means for oppositely reciprocating the same across the path of the thread-placing device, a guard having an open eye through which the thread-placing device passes and a downwardly curved deflecting wall to deflect the thread when leased.

21. In a warp leasing apparatus, a device for oppositely reciprocating a pair of flexible lease members comprising a vertically movable actuator, a guiding eye contained therein, a swinging arm having also a guiding eye, and connections between the actuator and the arm to cause the upward movement of the former to be accompanied by a downward movement of the latter.

22. A warp leasing apparatus having a vertically movable actuator with a lease cord guiding eye and a guiding and holding member also with a guiding eye oppositely moved by said actuator.

23. In a warp leasing apparatus, a device for moving a plurality of flexible lease members comprising a reciprocatory actuator having holding and guiding means for a flexible lease member carried thereby, a pair of holding and guiding devices on each side of said first-named means, and connections whereby the movement of said actuator in one direction is accompanied by an opposite movement of the holding and guiding devices at the side thereof.

24. In a lease cord vibrating mechanism, a pair of holding and guiding arms for reciprocatively moving a pair of separated lease cords in the same direction, an intermediate rack member adapted vibratively to swing said arms in a direction opposite to the movement of the rack, said rack member also carrying guiding means for an intermediate lease cord.

25. In a warp-leasing machine, the combination with warp-leasing mechanism, of means for supporting flexible lease members, and means for connecting said members to form a three-cord lease or to form a two-cord lease at the will of the operator.

26. A warp-leasing machine having lease members, and interchangeable devices for moving said members to effect the drawing of either a two-cord or a three-cord lease.

27. In a warp-leasing machine, the combination with a pair of leasing members, of thread-placing means, and means for moving the leasing members with relation to the movement of the thread-placing means to provide a lease formation in the warp threads, said moving means being adjustable to effect the formation of either a single-thread lease or a plural-thread lease.

28. In an apparatus for oppositely reciprocating a pair of lease members, a thread-placing device, means for moving said lease members at each threading movement, and means to adjust the machine to provide for their movement at each alternate threading movement.

29. In a machine for reciprocatively and oppositely moving a pair of lease members, the combination with means for intermittently moving the same and means for changing the timing of the said movement.

30. In a machine for forming a lease, a pair of lease members, means for oppositely reciprocating them once for each threading action, and means to change to the timing to cause their reciprocation once for each alternate threading movement.

31. In a leasing apparatus, a device for oppositely reciprocating a pair of lease members including a pair of interchangeable cams adapted to change the timing of said members.

32. A warp-leasing machine having lease members, and operating mechanism for effecting a lease formation of the warp threads with relation to the lease members, said mechanism being adjustable to form either a single-thread lease or a plural-thread lease.

33. In a warp-leasing machine, the combination with a pair of lease members comprising reciprocatory devices engaging said members, actuating means therefor, and interchangeable cams for moving said actuating means whereby the said reciprocating members may be timed to effect the formation of either a single-thread lease or a plural-thread lease.

34. In a warp leasing machine, the combination with a plurality of flexible lease-members, holding means for reversely vibrating said lease-members, an inclined guard projecting from the holding member at the side of one of the lease-members to cause a leased thread to be forced away on movement of the holding means, and a coöperating movable thread-placing member from whose path of movement the inclined guard forces the leased thread.

35. In a warp leasing machine, the combination with a reciprocatory thread-drawing device, of devices for oppositely reciprocating a pair of flexible lease members across the path of movement of the thread-drawing device, comprising holding and guiding means for the lease-members having provision for the lateral insertion therein of said lease-members, means for causing relative progressive movement between the thread drawing device and lease members and between the holding and guiding means and the lease members.

36. In a warp leasing machine, the combination with a reciprocatory thread-drawing device, of means for reciprocably moving a flexible lease-member, comprising means for holding and guiding said lease-member simultaneously on opposite sides of the path of said thread-drawing device, and means for reciprocating the same.

37. In a thread-leasing apparatus, a device for reciprocating a flexible lease member, comprising means for holding and guiding the same at two separated points, means for reciprocating said holding and guiding means, means for causing relative traverse between the same and said lease member, and a coöperating thread-drawing device.

38. A thread-leasing apparatus having means for oppositely reciprocating a pair of leasing-members comprising holding and guiding means, means reciprocatively to rock the same about an axis, and a coacting thread-drawing device for successively drawing threads from a warp.

39. In a warp leasing apparatus, holding and guiding means for a pair of flexible lease-members, a carriage for traversing the same lengthwise of the lease-members, means for reciprocatively rocking said holding and guiding means about an axis, and a coacting thread-drawing device for successively drawing threads from a warp.

In testimony whereof, we have signed our names to this specification, in the presence of two subscribing witnesses.

EDGAR F. HATHAWAY.
CHARLES LEA.

Witnesses:
JOHN B. FARWELL,
EVERETT S. EMERY.